United States Patent
Li et al.

(10) Patent No.: US 9,247,203 B2
(45) Date of Patent: Jan. 26, 2016

(54) OBJECT OF INTEREST BASED IMAGE PROCESSING

(75) Inventors: Qiang Li, Beijing (CN); Wenlong Li, Beijing (CN); Peng Wang, Beijing (CN); Tao Wang, Beijing (CN); Yangzhou Du, Beijing (CN); Jianguo Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 162 days.

(21) Appl. No.: 13/994,077

(22) PCT Filed: Apr. 11, 2011

(86) PCT No.: PCT/CN2011/072601
§ 371 (c)(1),
(2), (4) Date: Sep. 16, 2013

(87) PCT Pub. No.: WO2012/139275
PCT Pub. Date: Oct. 18, 2012

(65) Prior Publication Data
US 2013/0342640 A1   Dec. 26, 2013

(51) Int. Cl.
H04N 7/15       (2006.01)
H04N 19/115     (2014.01)
H04N 19/17      (2014.01)
H04N 19/167     (2014.01)
H04N 19/59      (2014.01)

(52) U.S. Cl.
CPC ............... *H04N 7/15* (2013.01); *H04N 19/115* (2014.11); *H04N 19/167* (2014.11); *H04N 19/17* (2014.11); *H04N 19/59* (2014.11)

(58) Field of Classification Search
CPC combination set(s) only.
See application file for complete search history.

(56) References Cited

U.S. PATENT DOCUMENTS

| | | | | |
|---|---|---|---|---|
| 6,097,853 | A * | 8/2000 | Gu | G06F 3/04845 382/199 |
| 2004/0179609 | A1* | 9/2004 | Takahashi et al. | 375/240.25 |
| 2005/0232502 | A1 | 10/2005 | Fukushima et al. | |
| 2006/0023953 | A1* | 2/2006 | Kliorin et al. | 382/232 |
| 2006/0093035 | A1* | 5/2006 | Kim | G06T 9/005 375/240.03 |
| 2006/0204034 | A1 | 9/2006 | Steinberg et al. | |
| 2006/0215753 | A1* | 9/2006 | Lee et al. | 375/240.08 |

(Continued)

FOREIGN PATENT DOCUMENTS

CN   1678075 A    10/2005
CN   101164341 A   4/2008

(Continued)

OTHER PUBLICATIONS

International Search Report and Written Report mailed Dec. 15, 2011 for PCT Application No. PCT/CN2011/072601, 16 pages.
Final Notice of Reasons for Rejection mailed Apr. 7, 2015 for Japanese Application No. 2014-504138. 5 pages.
Office Action mailed Jan. 16, 2015 for Taiwan Application No. 101112615, 10 pages.

(Continued)

*Primary Examiner* — Joseph J Nguyen
(74) *Attorney, Agent, or Firm* — Schwabe, Williamson & Wyatt, P.C.

(57) ABSTRACT

An apparatus, a method and a system are provided, wherein the system includes an encoding engine to encode and/or compress one or more objects of interest within individual image frames with higher bit densities than the bit density employed to encode and/or compress their background. The system may further include a context engine to identify a region of interest including at least a part of the one or more objects of interest, and scale the region of interest within individual image frames to emphasize the objects of interest.

24 Claims, 5 Drawing Sheets

(56) References Cited

U.S. PATENT DOCUMENTS

| | | | |
|---|---|---|---|
| 2006/0238445 A1* | 10/2006 | Wang et al. | 345/55 |
| 2008/0129844 A1* | 6/2008 | Cusack et al. | 348/241 |
| 2008/0198094 A1* | 8/2008 | Laughlin | 345/1.1 |
| 2010/0245532 A1 | 9/2010 | Kurtz et al. | |
| 2011/0243470 A1* | 10/2011 | Noguchi | 382/239 |

FOREIGN PATENT DOCUMENTS

| | | |
|---|---|---|
| CN | 101164344 A | 4/2008 |
| CN | 101313578 A | 11/2008 |
| JP | 07-135651 A | 5/1995 |
| JP | 2000099691 A | 4/2000 |
| JP | 2001-119696 A | 4/2001 |
| JP | 2001094980 A | 4/2001 |
| JP | 2005110160 A | 4/2005 |
| JP | 2005191760 A | 7/2005 |
| JP | 2005286442 A | 10/2005 |
| JP | 2008005349 A | 1/2008 |
| JP | 2009-246642 A | 10/2009 |
| JP | 2010087613 A | 4/2010 |
| WO | WO 0247386 A1 | 6/2002 |
| WO | WO 2006093999 A2 | 9/2006 |
| WO | WO 2008057285 A2 | 5/2008 |
| WO | WO2008057285 A2 | 5/2008 |

OTHER PUBLICATIONS

Office Action mailed Feb. 11, 2015 for Korean Application No. 10-2013-7026710, 7 pages.

Office Action mailed Oct. 8, 2014 for Korean Application No. 10-2013-7026710, 11 pages.

Office Action mailed Nov. 18, 2014 for Japanese Application No. 2014-504138, 4 pages.

Extended European Search Report mailed May 12, 2015 for European Application No. 11863271.0, 8 pages.

Notice of Final Rejection mailed Jun. 5, 2015 for Korean Application No. 10-2013-7026710, 4 pages.

Richard Y.D. Xu et al, "Individual Object Interaction for Camera Control and Multimedia Synchronization", Acoustics, Speech an Signal Processing, 2006. ICASSP 2006 Proceedings. 2006 IEEE International Conference on Toulouse, France May 14-19, 2006, Piscataway, NJ, USA, IEEE, Piscataway, NU, USA, May 14, 2006, P4 pages.

Touradj Ebrahimi et al., "MPEG-4 natural video coding—An overview", Signal Processing Laboratory, Swiss Federal Institute of Technology—EPFL, Signal Process: Image Communication 15 (2000), Lausanne, Switzerland; Mediamatics Inc., Fremont, CA, 22 pages.

* cited by examiner

OBJECT OF INTEREST BASED IMAGE PROCESSING

CROSS REFERENCE TO RELATED APPLICATIONS

The present application is a national phase entry under 35 U.S.C. §371 of International Application No. PCT/CN2011/072601, filed Apr. 11, 2011, entitled "OBJECT OF INTEREST BASED IMAGE PROCESSING", which designated, among the various States, the United States of America. The Specification of the PCT/CN2011/072601 Application is hereby incorporated by reference.

TECHNICAL FIELD

The present disclosure generally relates to data processing, in particular, to object of interest based image processing.

BACKGROUND

Unless otherwise indicated herein, the materials described in this section are not prior art to the claims in this application and are not admitted to be prior art by inclusion in this section.

Imaging processing applications in general, and video conferencing solutions in particular, may receive or capture live video image frames from one or more cameras, compress the captured video image frames, and transmit the compressed video image frames to one or more recipients, which may then decompress the received video image frames. Today, more and more image processing applications, such as video conferences, are conducted with mobile devices over networks, which may have relatively lower bandwidth compared with traditional networks configured to support the applications using stationary devices. As such, the quality of the transmitted video, and the user experience of these applications often may not be ideal.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

Figure 1:
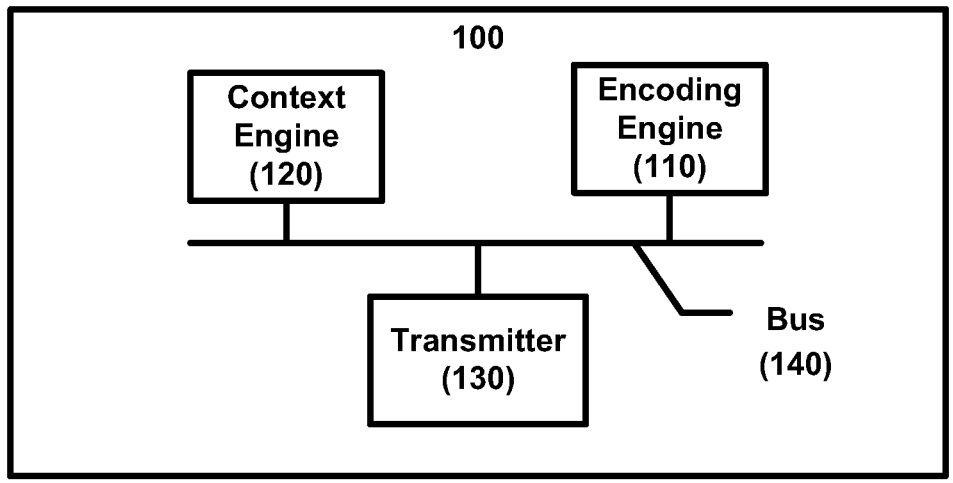
FIG. 1 is a block diagram illustrating an example image processing device, in accordance with various embodiments of the present disclosure.

Various embodiments of this disclosure may describe apparatuses, methods, and systems including an encoding engine configured to encode and/or compress one or more objects of interest within individual image frames with higher bit densities than the bit densities employed to encode and/or compress the background of the image frames. The image processing system may further include a context engine configured to identify a region of interest including at least a part of the one or more objects of interest, and to scale the region of interest within the respective frames to emphasize the objects of interest.

In various embodiments, an apparatus may include an encoding engine configured to receive a number of image frames of a video signal, and to encode and/or compress one or more regions associated with one or more objects of interest within respective image frames based on one or more bit densities that are higher than a bit density employed to encode and/or compress a background of the respective image frames, wherein the background and the one or more regions form the respective frame images. The apparatus may further include a transmitter coupled to the encoding engine and configured to transmit the encoded/compressed number of image frames to one or more recipients.

In various embodiments, the one or more objects of interest may include one or more faces of participants of a video conference.

In various embodiments, the apparatus may further include a context engine coupled to the encoding engine and configured to identify the one or more objects of interest within the respective image frames.

In various embodiments, the context engine may be further configured to identify a region of interest within the respective image frames, wherein the region of interest may include at least partially the one or more objects of interest.

In various embodiments, the context engine may be further configured to scale up the region of interest within the respective image frames to increase prominence of the region of interest within the respective image frames.

In various embodiments, the context engine may be further configured to adjust the region of interest to place at least one of the one or more objects of interest centrally within the respective image frames.

In various embodiments, the context engine may be further configured to adjust, based on context information, the region of interest to place at least one of the one or more objects of interest in an off-center position within the respective image frames.

In various embodiments, the one or more objects of interest of the apparatus may include one or more faces of participants of a video conference, and the context information may include face orientations of the one or more faces.

In various embodiments, the transmitter may be further configured to transmit the one or more objects of interest and the background separately.

In various embodiments, a method may include receiving a number of image frames of a video signal; and encoding and/or compressing one or more regions associated with one or more objects of interest within respective image frames based on one or more bit densities higher than a bit density employed to encode and/or compress a background of the respective image frames, wherein the background and the one or more regions form the respective image frames.

In various embodiments, the method may further include identifying the one or more objects of interest within the respective image frames.

In various embodiments, the method may further include identifying a region of interest within the respective image frames, wherein the region of interest includes at least partially the one or more objects of interest.

In various embodiments, the method may further include scaling up the region of interest within the respective image frames to increase prominence of the region of interest within the respective image frames.

In various embodiments, the method may further include adjusting the region of interest within the respective image frames to place at least one of the one or more objects of interest centrally within the respective image frames.

In various embodiments, the method may further include adjusting, based on context information, the region of interest to place at least one of the one or more objects of interest at an off-center position within the respective image frames.

In various embodiments, the one or more objects of interest of the method may include one or more faces of participants of a video conference, and wherein the context information may include face orientations of the one or more faces.

In various embodiments, the method may further include transmitting the encoded/compressed number of image frames to one or more recipients, wherein said transmitting may include transmitting the one or more objects of interest and the background separately.

In various embodiments, a system may include a camera configured to capture a video signal having a number of image frames; an encoding engine operatively coupled to the camera and configured to: receive the number of captured image frames; and encode and/or compress one or more objects of interest in respective image frames based on one or more bit densities that are higher than a bit density employed to encode and/or compress a background of the respective image frames, wherein the background and the one or more objects of interest form the respective image frames. The system may further include a transmitter coupled to the encoding engine and configured to transmit the encoded/compressed number of image frames to one or more recipients.

In various embodiments, wherein the context information may include a viewing angle of one of the one or more recipients; and wherein the context engine of the system may be further configured to control the camera to adjust the captured video signal based on the viewing angle of one of the one or more recipients.

In various embodiments, an article of manufacture may include a tangible and non-transitory computer-readable storage medium; and a number of programming instructions stored in the storage medium, and configured to cause an apparatus, in response to execution of the programming instructions, to perform operations including: receiving a number of image frames of a video signal; and encoding and/or compressing one or more objects of interest within respective image frames based on one or more bit densities that are higher than a bit density employed to encode and/or compress a background of the respective image frames, wherein the background and the one or more objects of interest form the image frames.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The description may refer to "object of interest" and "background" of respective image frames. For the purpose of this application, including the claim, the term "background," refers to the remaining portion, less the one or more "object of interest" of an image frame, unless the contact clearly indicates otherwise.

FIG. 1 is a block diagram illustrating an example image processing device, in accordance with various embodiments of the present disclosure. As illustrated in FIG. 1, an image processing device 100 may include an encoding engine 110, a context engine 120, and a transmitter 130, coupled with each other via a bus 140. While FIG. 1 depicts various components of the device 100 coupled via the bus 140, in various embodiments, the encoding engine 110, the context engine 120 and the transmitter 130 may be coupled via any suitable mechanisms, such as one or more point to point connections, or an hierarchy of buses.

Although FIG. 1 depicts particular components, the device 100 may include other suitable components to facilitate image processing and/or transmission, such as an antenna, a camera, a decoding engine, a display, etc., which are not shown for ease of understanding the disclosure. Further, although the components shown in FIG. 1 are depicted as separate blocks within the device 100, the functions performed by some of these blocks may be integrated within a single component or may be further subdivided using two or more separate components. For example, the decoding engine (not shown) and the encoding engine 110 may be integrated into a single decoding/encoding engine. In addition, the device 100, including all or part of the encoding engine 110, the context engine 120, and the transmitter 130, may be implemented in either software or hardware, or a combination thereof.

In various embodiments, the image processing device 100 may include wired or wireless electronic devices such as a desktop computer, a laptop computer, a handheld computer, a tablet, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices.

In various embodiments, the image processing device 100 may transmit processed images via one or more wired or wireless network connections, such as a private network, a personal area network (PAN), a local area network (LAN), a virtual private network (VPN), a metropolitan area network (MAN), wide area network (WAN), a proprietary network, or the public network commonly referred to as the Internet, or a combination thereof.

In various embodiments, the image processing device 100 may have capabilities to use a variety of modulation techniques to wirelessly transmit the processed images, including spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), SC-FDMA (single carrier FDMA), and/or other suitable modulation techniques to communicate via wireless links. In one example, the video conferencing device 100 may operate in accordance with suitable wireless communication protocols that require very low power such as Bluetooth, Zigbee, near field communication (NFC), ultra-wideband (UWB), and/or radio frequency identification (RFID) to implement a wireless personal area network (WPAN), a wireless local area network (WLAN), and/or a wireless metropolitan area network (WMAN).

In various embodiments, the image processing device 100 may be part of a video conference application or system, and may facilitate a video conference with one or more other image processing devices (not shown), which may or may not be similar to the image processing device 100.

In various embodiments, the encoding engine 110 may receive a video signal including a series of image frames. In various embodiments, the video signal may include the image frames in uncompressed raw data format. In various embodiments, the video signal may have already been encoded/compressed in certain lossy or lossless encoding/compression schemes, such as H.261, published by International Telecommunication Union Telecommunication Standardization Sector (ITU-T) in 1984, MPEG-1 part 2, published by International Organization for Standardization (ISO) in 1993, and H.264/MPEG-4 AVC, published by ISO in 1998, etc. The encoding engine 110 may receive the video signal from a communication interface of the device 100 (not shown), which may receive the video signal from an external source. Alternatively, the encoding engine 110 may receive the video signal via the bus 140, from a video camera attached to, or otherwise integrated with the device 100.

The encoding engine 110 may be configured to encode and/or compress the image frames, either one by one as a stream, or in parallel. The encoding engine 110 may transcode (e.g., decode a video signal and re-encode it based on a different scheme) the video signal if it has already been encoded/compressed. The encoding engine 110 may encode or add additional information to the video signal, such as information related to searched forwards, backwards, or random access of the video signal, subtitles, and digital rights management, etc. The encoding engine 110 may encode/compress the image frames using any known video/image compression schemes or methods, such as interframe compression, intraframe compression, discrete cosine transform (DCT), fractal compression, matching pursuit, discrete wavelet transform (DWT), etc.

In various embodiments, the encoding engine 110 may have information related to one or more objects of interest (OOI) within one or more image frames. The OOI may be related to applications or usage scenarios of the device 100. Example OOIs may include a speaker's face and/or shoulder area during a video conferencing session, a motor vehicle driving through a race track during a televised broadcast, a moving object captured and/or tracked by a surveillance camera, etc. In various embodiments, the number of OOI regions contained within an image frame of a video signal may change from frame to frame. For example, there may be a single OOI in an image frame, and multiple OOIs in subsequent or other image frames.

Figure 2:
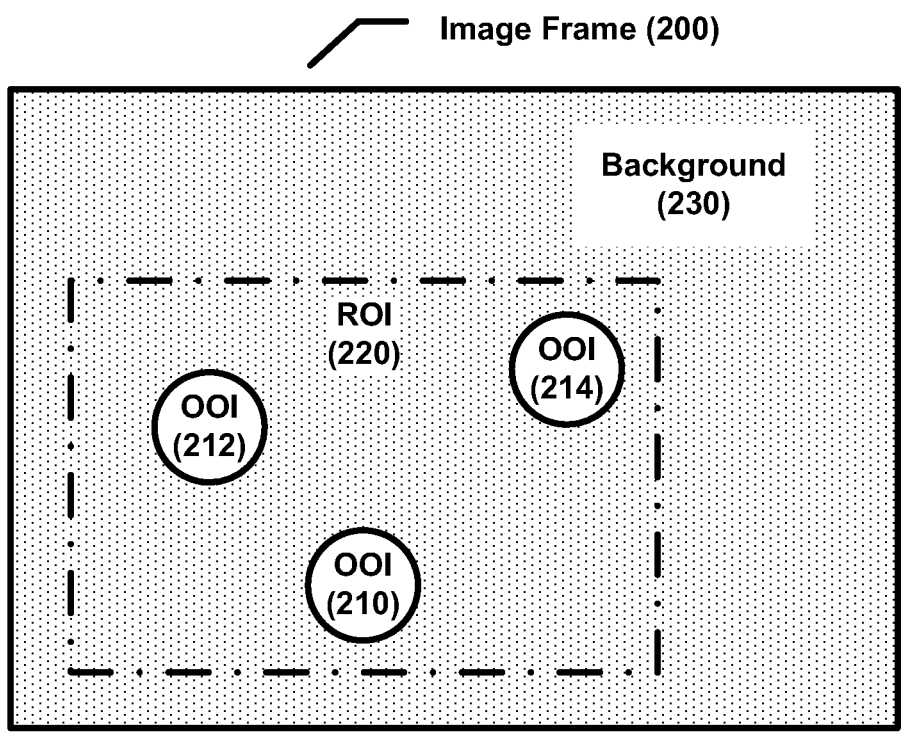
FIG. 2 is a block diagram illustrating an example individual image frame of a video signal, in accordance with various embodiments of the present disclosure.

FIG. 2 is a block diagram illustrating an example individual image frame of a video stream, in accordance with various embodiments of the present disclosure. As illustrated, an image frame 200 may include an OOI region 210, an OOI region 212, an OOI region 214, and a background 230, as indicated by the shaded area within the image frame 200, surrounding the OOI regions 210-214. Although FIG. 2 depicts the image frame 200 having three OOI regions, in various embodiments, the image frame 200 may include more or less OOI regions. Although FIG. 2 illustrates the multiple OOI regions 210-214 with the same size and shape, it is understood that the size, shape, and position of the various OOI regions 210-214 are merely illustrative, and may be different in various embodiments. Further, the example illustration shows the background 230 surrounding the OOI regions 210-214, in other image frames, the background 230 may only partially surround, or be adjacent to the OOI regions 210-214.

In various embodiments, the encoding engine may apply different quantize parameters to encode/compress the one or more OOI regions 210-214 and the background 230, which together with the OOI regions 210-214 makes up the image frame. In certain embodiments, the encoding engine 110 may be configured to encode/compress the one or more OOI regions 210-214 using one or more bit densities that are higher than a bit density used to encode/compress the background 230. For example, in a video conference application using the device 100, the areas around a speaker's face and shoulder may be identified as two OOI regions, respectively. The encoding engine 110 may encode/compress the area around the speaker's face using a high bit density that may allow other conference attendees to more clearly see the speaker's facial expression, and encode/compress the area around the speaker's shoulder using a medium bit density, and encode/compress the background of the image frame using a low bit density. As such, the face area of the speaker (e.g., the one or more OOI regions) may be allocated with more bits to that of the non-face areas (e.g., the background) within each image frame. What constitutes high, medium, or low bit density may vary from application to application.

In various embodiments, in addition to or instead of the above described bit-density preferential encoding and/or compression, the encoding engine 110 may encode/compress the image frame 200 using region based coding techniques. For example, the OOI regions 210-214 and the background 230 may be separately encoded/compressed using different encoding/compression models. The encoding engine 110 may encode/compress the background 230 based on a non-parametric background model. The encoding engine 110 may encode/compress and compress the OOI regions 210-214 based on a separate encoding and/or compression model. The encoded/compressed OOI regions 210-214 of the image frame 200 may be transmitted to one or more recipients (not shown in FIG. 1) via the transmitter 130, separately from the encoded/compressed background 230. The one or more recipients may decompress and decode the background and the OOI regions separately as received, and combine the regions and the background to reconstruct the complete image frame.

In various embodiments, the encoding engine 110 may encode/compress a particular image frame 200 based on previous or subsequent image frames to achieve more efficient compression, such as by using interframe compression, etc.

In various embodiments, such as video conferencing applications, the background 230 may be static or substantially static for most of the time and may not change or change minimally from frame to frame. Accordingly, rather than transmit the background in each image frame, the transmitter 130 may transmit the background 230 periodically, for every two or more image frames. In other embodiments, the transmitter 130 may transmit the background 230 dynamically, upon a detected (substantial) change to the background over one or more previous image frames. By using bit-density optimized encoding and/or region based encoding/compression techniques, where the background and the OOI regions are encoded, compressed and transmitted separately, the coding and/or transmission efficiency of the device 100 may be enhanced. Accordingly, the user experience of a video conferencing application based on the device 100 may be improved, especially in a video conference conducted using mobile devices, where network bandwidth may be limited.

In various embodiments, the context engine 120 may be configured to detect, identify, and/or track the one or more OOI regions 210-214 within the image frame 200 or in a video stream, and provide the information related to the OOI regions 210-214 to the encoding engine 110. The context engine 120 may detect the OOI regions 210-214 based on various techniques known for object tracking or facial recognition. One of such object tracking technique may be to exhaustively scan a window over an image frame based on a cascade of AdaBoost classifiers. In various embodiments, the context engine 120 may provide the OOI information to assist the encoding engine 110 in encoding and/or compressing the image frames.

In various embodiments, the context engine 120 may be further configured to identify a region of interest (ROI) within an image frame that may include at least part of the one or more OOI regions. An example ROI may be the ROI 220 illustrated as the area surrounded by the dashed-line in FIG. 2. The location and the size of the ROI 220 may be identified based on a bounding box represented by its coordinates such as (Rx, Ry). In various embodiments, the ROI 220 may or may not include parts of the background 230.

In various embodiments, the context engine 120 may also identify a center point $P_c$ within the ROI region 220. In certain embodiments, $P_c$ may be defined as the weighted center of all the OOI regions within the ROI. For example, $P_c$ may be identified based on the following expression:

$$P_c = \sum_{i=0}^{N} P_i/N$$

where $P_i$ is the center position of each of the detected OOI regions, and N is the number of detected OOI regions. In other embodiments, $P_c$ may be identified as the center point of the biggest OOI region within the ROI, such as the object of interest that is closest to the camera. For example, $P_c$ may be defined as $$P_c = \arg\max(\text{size}(P_i))$$

where argmax (size($P_i$)) is the center point of the OOI region that has the biggest size. In yet some other embodiments, $P_c$ may be the center point of the OOI that has detected changes from one or more previous frames. For example, $P_c$ may be used to indicate the OOI that represents a person who is currently speaking in a video conference with multiple participants, or one of the moving objects that is tracked by a surveillance camera. In various embodiments, as discussed above, $P_c$ may or may not be the true "center" of the ROI 220.

In various embodiments, as illustrated, the context engine 120 may identify the ROI region 220 by a bounding box that includes all of the OOI regions 210-214. In various embodiments, once the ROI 220 is identified, the context engine 120 may adjust the ROI 220, including adjusting its size, position, and scaling, to make the center point $P_c$ at or close to a center portion of the image frame 200. In various embodiments, an area surrounding the ROI 220 may also be moved and/or scaled along with the ROI 220 to maintain the spatial correlation between the ROI 220 and the portion of the background 230 surrounding the ROI 220.

In certain embodiments, the context engine 120 may scale up the ROI 220 as much as possible to the dimension (or raw size) of the image frame 200, which may or may not distort the image within the ROI 220. In certain embodiments, the dimension (or aspect ratio) of the ROI 220 may not scale-up to match the dimension (or aspect ratio) of the image frame 200. Accordingly, the context engine may selectively choose to include a portion of the background area 230, or remove a portion of the ROI 220, to display the image within the ROI 220 in a correct aspect ratio. Similarly, the context engine 120 may selectively remove/include a portion of the ROI 220 and the background 230 in order to move the center point $P_c$ at or close to a center location of the image frame 200. As a result, at least one of the OOIs within the ROI 220, for example, the OOI 210, may appear bigger and focused at or near a center portion of the image frame 200.

In various embodiments, the context engine 120 may provide the image frame including the scaled/modified ROI 220 to the encoding engine 110 to assist the encoding engine 110 in encoding and/or compressing, and subsequent transmission of the image frames, as previously disclosed.

In various embodiments, a camera (not shown) may be attached to or otherwise integrated with the device 100 to capture a video signal having a stream of image frames. The context engine 120 may be operatively coupled to the camera and configured to control the camera. Upon identification of the ROI 220 within each image frame, rather than scaling up, or moving the ROI 220, the context engine 120 may control the camera to zoom in or out, or pan the camera angle, to focus on the ROI 220, thereby placing at least one of the OOI within the ROI 220 in a center portion of the image frame 200.

In various embodiments, the context engine 120 may be further configured to adjust the size and location of the ROI 220 to intentionally put at least one of the OOI at an off-center position based on one or more pieces of context information. The context information may depend on the application or usage scenario of the device 100. For example, in a video conferencing session, the context engine 120 may use the face orientation (e.g., pose) of the current speaker as the context information.

In various embodiments, face orientation information may be used to infer a potential area of interest besides the identified ROI and may be used to stabilize the extraction of the ROI. For example, if the speaker is looking straight at the camera, the speaker may be shown at or near the center portion of the video. However, if the speaker talks while looking towards his/her right side, in various embodiments, the context engine 120 may selectively move or pan the window of the ROI 220 to the "right side" of the speaker, scale up or down, or otherwise adjust, the ROI 220 to show more background 230 at the "right side" of the speaker. For another example, a video conference may include multiple participants. The context engine 120 may initially recognize all the participants as objects of interest and draw the ROI to include all the participants. However, face orientation information may indicate that one of the participants is not looking at the camera, but has his/her head down (maybe reading). In various embodiments, the context engine 120 may choose to temporarily exclude that participant (or OOI) from the ROI, so that the person who is/are currently engaged in the conversation may be shown more prominently at the center of the screen. In various embodiments, upon a detection of a (substantial) change of the face orientation of that participant, the context engine 120 may re-adjust the ROI 220 to include that participant in the image.

In various embodiments, the context engine 120 may be configured to analyze the image frame 200 and to produce the context information. For example, in a video conference application, to include face orientation of the speaker as the context information, the context engine 120 may be configured to analyze the face orientation of the speaker. The context engine 120 may analyze the face orientation of the speaker based on measurements and analysis of three different angles of the face, e.g., pitch, yaw, and roll.

In various embodiments, instead of the context engine 120 analyzing the image frame to produce the context information, the context information may be provided to the context engine 120. For example, the video may be transmitted by the transmitter 130 of the device 100 to one or more recipients via a network. The viewpoints (or viewing angles) of the one or more recipients may be tracked by one or more cameras installed at the recipients' side based on similar face orientation tracking methods as previously described, or other known methods. Alternatively, in addition to the face orientation tracking, the gestures of the one or more recipients may be similarly identified and/or tracked by the cameras, utilizing any known method, such as an Xbox 360® Kinect® camera kit available from Microsoft, Redmond, Wash., with appropriate software. Accordingly, in certain embodiments, the context information may include viewpoints and/or gestures of the one or more recipients of the video. For example, if the recipient is looking toward the left-side of the video, such viewpoint information may be feedback to the context engine 120 via the network, and the context engine 120 may adjust the ROI region 220 of the video, or one or more of the attached cameras, to show more information toward the left-side of the video. The gestures of the recipients may also be feedback to the context engine 120 for similar purposes. Alternatively, the recipients of the video may provide the context information to the context engine 120 via other input methods, such as a keyboard, a mouse, voice input via a microphone, etc. Accordingly, by receiving context information from the one or more recipients, the device 100 may be able to provide a virtual-reality effect to attendees of a video conference, or remote-control capabilities to the recipients of the video.

In various embodiments, the context engine 120 may provide the image frame including the adjusted ROI 220 based on the context information to the encoding engine 110 to assist encoding and/or compressing of the image frames, and subsequent transmission of such by the transmitter 130, as previously disclosed.

Figure 3:
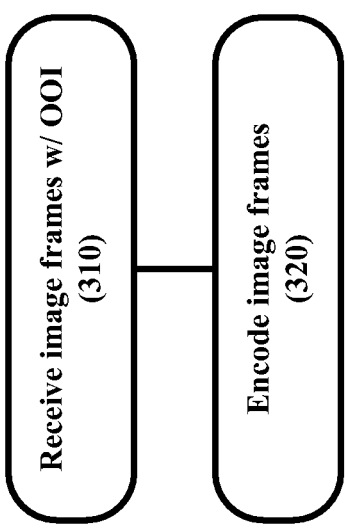
FIG. 3 is a flow diagram illustrating a portion of the operations of an encoding engine of the image processing device, in accordance with various embodiments of the present disclosure.

FIG. 3 is a flow diagram illustrating a portion of the operations of an encoding engine of the image processing device, in accordance with various embodiments of the present disclosure. In block 310, the encoding engine 110 may receive a stream of image frames and information related to the one or more OOI regions embedded in each image frame. In block 320, the encoding engine 110 may encode/compress each image frame with the bit-density preferential encoding/compressing and/or region based differential encoding/compressing as previously disclosed. In the region based encoding/compressing, the transmitter 130 may transmit the background and the one or more OOI regions separately to one or more recipients. The transmitter 130 may transmit the background periodically, over every two image frames or more, or dynamically, upon a detected change in the background. The encoding engine 110 may repeat the above operations until all the images are processed. The one or more OOI regions may be transmitted in each image frame. The one or more recipients may then decompress and reconstruct the images as they are received.

Figure 4:
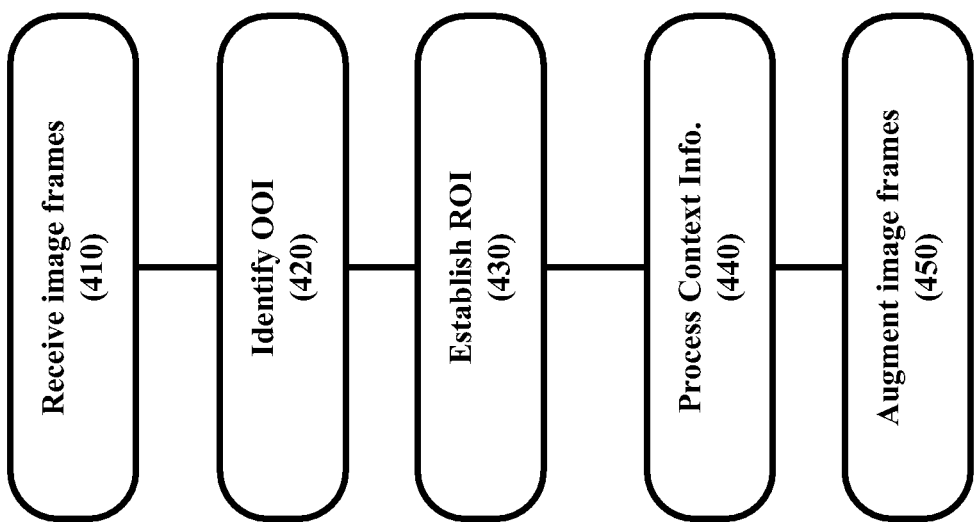
FIG. 4 is a flow diagram illustrating a portion of the operations of a context engine of the image processing device, in accordance with various embodiments of the present disclosure.

FIG. 4 is a flow diagram illustrating a portion of the operations of a context engine of the image processing device, in accordance with various embodiments of the present disclosure. In block 410, the context engine 120 may receive a stream of image frames, and may be configured to process the stream of image frames one by one, or in parallel. The context engine 120 may receive the stream of image frames in parallel with the encoding engine 110, or alternatively, process the image frames prior to the encoding engine 110. In block 420, the context engine 120 may identify one or more OOI regions within an image frame, and provide the OOI regions information to the encoding engine 110 for encoding and/or compressing as previously disclosed. In block 430, the context engine 120 may establish an ROI within the image frame that includes at least one of the OOI regions. The context engine 120 may scale the ROI and reduce areas outside of the ROI within the image frame so that one or more of the OOI regions may be shown prominently and appear focused within the image, at the center of the image. The context engine 120 may adjust size and position of the ROI to place at least one or more OOI centrally within the image frame. In block 440, the context engine 120 may analyze the image frame to produce context information associated with the image frame. In block 450, the context engine 120 may adjust the ROI based on the context information to place at least one of the one or more OOI regions in an off-center position within the image frame. The context engine 120 may pass the OOI and/or ROI information, with or without adjustment under the context information, to the encoding engine 110. The context engine 120 may repeat the above steps until all the images are processed.

Figure 5:
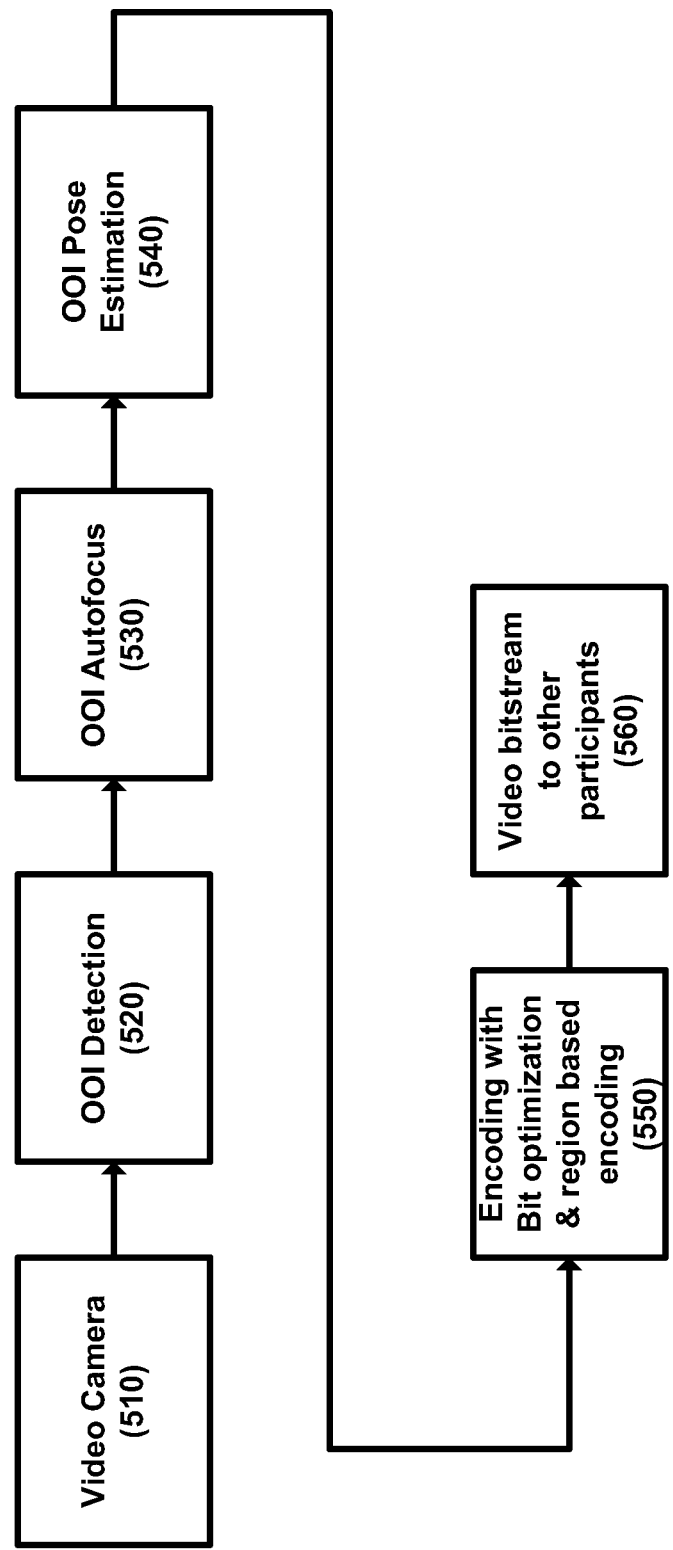
FIG. 5 is a flow diagram illustrating a portion of the operations of the image processing device, in accordance with various embodiments of the present disclosure.

FIG. 5 is a flow diagram illustrating a portion of the operations of the image processing device, in accordance with various embodiments of the present disclosure. In block 510, one or more video cameras (not shown in FIG. 1) attached to the image processing device 100 may capture video images in two-dimensional (2D) or three-dimensional (3D) format. In block 520, the context engine may analyze each image frame to identify one or more OOI regions. In block 530, the context engine 120 may establish an ROI within the image frame and scale the ROI within the image frame to place at least one OOI at the center portion of the image frame. In block 540, the context engine may analyze the image frame and produce one or more pieces of context information, including estimation of face orientation information, and modify the ROI according to the context information. The context engine 120 may forward the image frame, including the modified ROI to the encoding engine 110. In block 550, the encoding engine 110 may encode/compress the stream of image frames based on either bit-density preference or region based differential encoding and/or compressing, either one by one or in parallel. In block 560, the transmitter 130 may transmit the encoded/compressed image frames to one or more recipients. The context engine 120, the encoding engine 110, and the transmitter 130 may repeat the above steps until all the image frames are processed.

Figure 6:
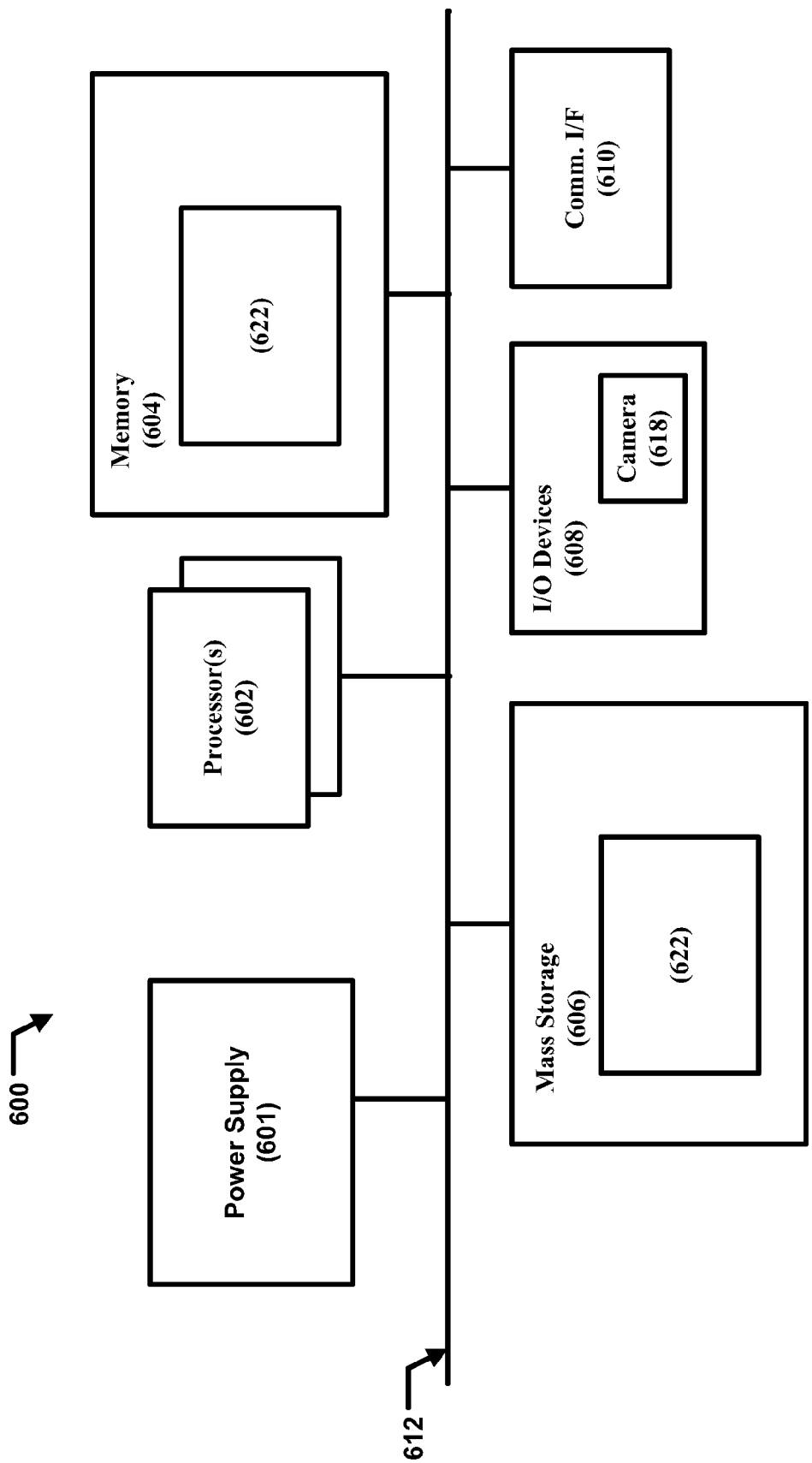
FIG. 6 is a block diagram illustrating an example computer system suitable for use to practice various aspects of the described methods and/or apparatus, in accordance with embodiments of the present disclosure.

FIG. 6 is a block diagram illustrating an example computer system suitable for use to practice various aspects of the described methods and/or apparatus, in accordance with embodiments of the present disclosure. As shown, a computer system 600 may include a power supply unit 601, a number of processors or processor cores 602, a system memory 604, a mass storage 606, and a communication interface 610. For the purpose of this application, including the claims, the terms "processor" and "processor cores" may be considered synonymous, unless the context clearly requires otherwise.

Additionally, the computing system 600 may include one or more tangible, non-transitory computer-readable mass storage devices 606 (such as diskette, hard drive, compact disc read only memory (CDROM) and so forth), input/output devices 608 (such as keyboard, cursor control and so forth). In various embodiments, the I/O devices 608 may include one or more cameras 618. The elements may be coupled to each other and to the earlier enumerated elements via system bus 612, which represents one or more buses. In the case of multiple buses, they may be bridged by one or more bus bridges (not shown). Data may pass through the system bus 612 from the I/O devices 608, for example, from the camera 618, to the processors 602.

The system memory 604 and the mass storage 606 may be employed to store a working copy and a permanent copy of the programming instructions implementing one or more operating systems, firmware modules or drivers, applications, and so forth, herein collectively denoted as 622. The programming instructions, upon execution by the processors 602, may cause the computing system 600 to perform the operations of the encoding engine 110, the context engine 120, and/or the transmitter 130 as previously disclosed. The camera 618 may capture a stream of video images, and may be subject to the control of the context engine 120 as previously disclosed.

The permanent copy of the programming instructions may be placed into the permanent storage 606 in the factory, or in the field, through, for example, a distribution medium (not shown), such as a compact disc (CD), or through the communication interface 610 (from a distribution server (not shown)). That is, one or more distribution media having an implementation of the agent program may be employed to distribute the agent and program various computing devices.

The remaining constitution of these elements 601-622 are known, and accordingly will not be further described.

Figure 7:
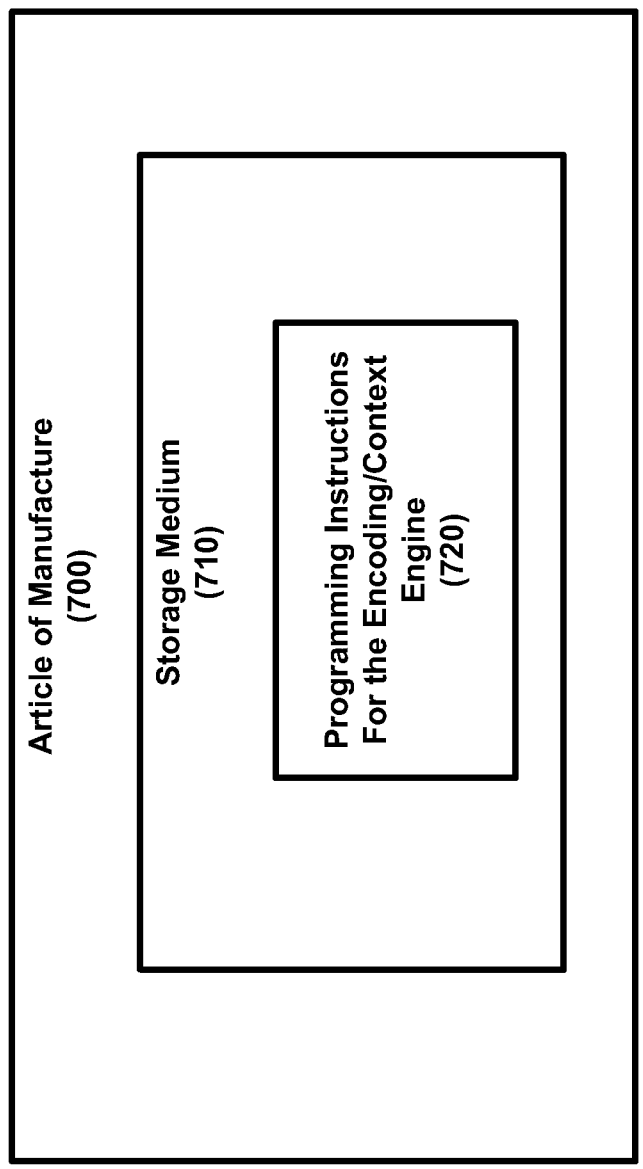
FIG. 7 is a block diagram illustrating an article of manufacture having programming instructions configured to cause an apparatus to practice various operations of the image processing device, in accordance with embodiments of the present disclosure.

FIG. 7 illustrates an article of manufacture with programming instructions configured to enable an apparatus to practice various operations of an image processing device, in accordance with embodiments of the present disclosure. As shown, article of manufacture 700 may include a computer-readable non-transitory storage medium 710. Storage medium 710 may include programming instructions 720 configured to implement the image processing device.

Storage medium 710 represents a broad range of persistent storage medium known in the art, including but are not limited to flash memory, optical or magnetic disks. Programming instructions 720, in particular, may enable an image processing apparatus, in response to their execution by the apparatus to perform operations including: receiving a number of image frames of a video signal; and encoding and/or compressing one or more objects of interest within respective image frames based on one or more bit densities that are higher than a bit density employed to encode/compress a background of the respective image frames, wherein the background and the one or more objects of interest form the respective image frames.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. An apparatus comprising:
   an encoding engine configured to:
   receive a plurality of image frames of a video signal;
   identify a region of interest, ROI, associated with one or more objects of interest, OOI, within respective image frames where a center point of the ROI is determined based at least in part on center points of the OOI, and where the center point of the ROI is identified as the weighted center of all of the OOI within the ROI region as identified by $$P_c = \sum_{i=0}^{N} P_i / N$$

where $P_i$ is the center position of each of the detected OOI regions, and N is the number of detected OOI regions;
   encode the ROI associated with one or more OOI within respective image frames based on one or more bit densities that are higher than a bit density of a background region, wherein the background region surrounds the one or more ROI associated with the one or more OOI; and
   a transmitter coupled to the encoding engine and configured to transmit the encoded plurality of image frames to one or more recipients.

2. The apparatus of claim 1, wherein the one or more OOI include one or more faces of participants of a video conference.

3. The apparatus of claim 1, further comprising a context engine coupled to the encoding engine and configured to identify the one or more OOI within the respective image frames.

4. The apparatus of claim 3, wherein the context engine is further configured to identify a region of interest within the respective image frames, wherein the ROI includes at least partially the one or more OOI.

5. The apparatus of claim 4, wherein the context engine is further configured to enlarge the ROI within the respective image frames to display the ROI more prominently within the respective image frames.

6. The apparatus of claim 4, wherein the context engine is further configured to adjust the ROI to place at least one of the one or more OOI centrally within the respective image frames.

7. The apparatus of claim 4, wherein the context engine is further configured to adjust, based on a context information, the ROI to place at least one of the one or more OOI in an off-center position within the respective image frames.

8. The apparatus of claim 6, wherein the one or more OOI include one or more faces of participants of a video conference, and wherein the context information includes face orientations of the one or more faces.

9. The apparatus of claim 1, wherein the transmitter is further configured to transmit the one or more OOI and the background region separately.

10. The method of claim 9, further comprising transmitting the encoded plurality of image frames to one or more recipients, wherein said transmitting includes transmitting the one or more OOI and the background region separately.

11. The apparatus of claim 1, wherein the center point of the ROI is identified as the center point of the biggest OOI region within the ROI as identified by $P_c = \arg\max(\text{size}(P_i))$ where $\arg\max(\text{size}(P_i))$ is the center point of the OOI region that has the biggest size.

12. A method comprising:
receiving a plurality of image frames of a video signal;
identifying a region of interest, ROI, associated with one or more objects of interest, OOI, within respective image frames where a center point of the ROI is determined based at least in part on center points of the OOI, and where the center point of the ROI is identified as the weighted center of all of the OOI within the ROI region as identified by $$P_c = \sum_{i=0}^{N} P_i / N$$

where $P_i$ is the center position of each of the detected OOI regions, and N is the number of detected OOI regions;
encoding the ROI associated with one or more OOI within respective image frames based on one or more bit densities higher than a bit density of a background region, wherein the background region surrounds the one or more ROI associated with the one or more OOI; and
transmitting the encoded plurality of image frames to one or more recipients.

13. The method of claim 12, further comprising identifying the one or more OOI within the respective image frames.

14. The method of claim 12, further comprising identifying a ROI within the respective image frames, wherein the ROI includes at least partially the one or more OOI.

15. The method of claim 14, further comprising enlarging the ROI within the respective image frames to display the ROI more prominently within the respective image frames.

16. The method of claim 14, further comprising adjusting the ROI within the respective image frames to place at least one of the one or more OOI centrally within the respective image frames.

17. The method of claim 14, further comprising adjusting, based on a context information, the ROI to place at least one of the one or more OOI at an off-center position within the respective image frames.

18. The method of claim 17, wherein the one or more OOI include one or more faces of participants of a video conference, and wherein the context information includes face orientations of the one or more faces.

19. The method of claim 12, wherein the center point of the ROI is identified as the center point of the biggest OOI region within the ROI as identified by $P_c = \arg\max(\text{size}(P_i))$ where $\arg\max(\text{size}(P_i))$ is the center point of the OOI region that has the biggest size.

20. A system comprising:
a camera configured to capture a video signal having a plurality of image frames;
an encoding engine operatively coupled to the camera and configured to:
receive the plurality of captured image frames;
identify a region of interest, ROI, associated with one or more objects of interest, OOI, within respective image frames where a center point of the ROI is determined based at least in part on center points of the OOI, and where the center point of the ROI is identified as the weighted center of all of the OOI within the ROI region as identified by $$P_c = \sum_{i=0}^{N} P_i / N$$

where $P_i$ is the center position of each of the detected OOI regions, and N is the number of detected OOI regions; and
encode the ROI in respective image frames based on one or more bit densities that are higher than a bit density of a background region of the respective image frames, wherein the background region surrounds the one or more OOI; and
a transmitter coupled to the encoding engine and configured to transmit the encoded plurality of image frames to one or more recipients.

21. The system of claim 20, wherein said transmitting includes transmitting one or more OOI and the background region separately, wherein said transmitting separately further includes transmitting the one or more OOI with each of the plurality of image frames, and transmitting the background region periodically over two or more image frames, or transmitting the background region dynamically upon a detected change of the background region from previous image frames.

22. An article of manufacture comprising:
a tangible and non-transitory computer-readable storage medium; and
a plurality of programming instructions stored in the storage medium, and configured to cause an apparatus, in response to execution of the programming instructions, to perform operations including:
receiving a plurality of image frames of a video signal;
identify a region of interest, ROI, associated with one or more objects of interest, OOI, within respective image frames where a center point of the ROI is determined based at least in part on center points of the OOI, and where the center point of the ROI is identified as the weighted center of all of the OOI within the ROI region as identified by $$P_c = \sum_{i=0}^{N} P_i / N$$

where $P_i$ is the center position of each of the detected OOI regions, and N is the number of detected OOI regions;
    encoding one or more OOI within respective image frames based on one or more bit densities that are higher than a bit density of a background region of the respective image frames, wherein the background region surrounds the one or more OOI; and
    transmitting the encoded plurality of image frames to one or more recipients.

23. The article of claim 22, wherein the operations further include:
    identifying the one or more OOI within the respective image frames; and
    identifying a ROI includes at least partially the one or more objects of interest.

24. The article of claim 22, wherein the operations further include adjusting the ROI to place the one or more OOI centrally within the ROI, or at an off-center position within the ROI based on a context information.

* * * * *